United States Patent
Han et al.

(10) Patent No.: US 11,155,752 B2
(45) Date of Patent: *Oct. 26, 2021

(54) LIQUID CRYSTAL COMPOSITION AND DISPLAY DEVICE THEREOF

(71) Applicant: Jiangsu Hecheng Display Technology Co., Ltd., Yangzhong (CN)

(72) Inventors: Wenming Han, Yangzhong (CN); Haibin Xu, Yangzhong (CN); Shuang Xu, Yangzhong (CN)

(73) Assignee: Jiangsu Hecheng Display Technology Co., Ltd., Yangzhong (CN)

( * ) Notice: Subject to any disclaimer, the term of this patent is extended or adjusted under 35 U.S.C. 154(b) by 121 days.

This patent is subject to a terminal disclaimer.

(21) Appl. No.: 16/483,933

(22) PCT Filed: Apr. 17, 2018

(86) PCT No.: PCT/CN2018/083330
§ 371 (c)(1),
(2) Date: Aug. 6, 2019

(87) PCT Pub. No.: WO2018/192476
PCT Pub. Date: Oct. 25, 2018

(65) Prior Publication Data
US 2019/0345386 A1 Nov. 14, 2019

(30) Foreign Application Priority Data
Apr. 18, 2017 (CN) .......................... 201710253538.7

(51) Int. Cl.
| | | |
|---|---|---|
| *G02F 1/1333* | (2006.01) | |
| *C09K 19/12* | (2006.01) | |
| *C09K 19/30* | (2006.01) | |
| *G02F 1/13* | (2006.01) | |
| *G02F 1/137* | (2006.01) | |

(52) U.S. Cl.
CPC .......... *C09K 19/12* (2013.01); *C09K 19/3003* (2013.01); *G02F 1/13* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *G02F 1/13712* (2021.01)

(58) Field of Classification Search
CPC ................ C09K 19/12; C09K 19/3003; C09K 2019/123; C09K 2019/3004; C09K 2019/3009; C09K 2019/301; C09K 2019/3016; G02F 1/13; G02F 1/13712; G02F 1/1333
USPC ................................................... 252/299.63
See application file for complete search history.

(56) References Cited

U.S. PATENT DOCUMENTS

| | | | |
|---|---|---|---|
| 6,210,603 B1 | 4/2001 | Kondo et al. | |
| 6,896,939 B2* | 5/2005 | Klasen-Memmer | ... C09K 19/42 |
| | | | 428/1.1 |
| 7,371,437 B2 | 5/2008 | Klasen-Memmer et al. | |
| 7,854,970 B2 | 12/2010 | Klasen-Memmer et al. | |
| 7,989,035 B2 | 8/2011 | Klasen-Memmer et al. | |
| 8,399,073 B2 | 3/2013 | Klasen-Memmer et al. | |
| 9,428,693 B2 | 8/2016 | Wen et al. | |
| 9,683,173 B2 | 6/2017 | Kuriyama et al. | |
| 9,777,216 B2 | 10/2017 | Klasen-Memmer et al. | |
| 2007/0239631 A1 | 10/2007 | Wang | |
| 2011/0047226 A1 | 2/2011 | Gabriel et al. | |
| 2015/0036095 A1 | 2/2015 | Jeong et al. | |
| 2015/0259600 A1* | 9/2015 | Fujisawa ............ C09K 19/3028 |
| | | | 252/299.63 |
| 2021/0017450 A1* | 1/2021 | Wang .................... G02F 1/1333 |

FOREIGN PATENT DOCUMENTS

| | | |
|---|---|---|
| CN | 1912052 A | 2/2007 |
| CN | 101376810 A | 3/2009 |
| CN | 101629081 A | 1/2010 |
| CN | 101880533 A | 11/2010 |
| CN | 102264867 A | 11/2011 |
| CN | 102753653 A | 10/2012 |
| CN | 103254907 A | 8/2013 |
| CN | 104136575 A | 11/2014 |
| CN | 104136576 A | 11/2014 |
| CN | 104263383 A | 1/2015 |
| CN | 104513666 A | 4/2015 |
| CN | 104593011 A | 5/2015 |

(Continued)

OTHER PUBLICATIONS

Hu et al., "Synthesis and Properties of Laterally O-Difluoro-Substituted Terphenyl Chiral Liquid Crystals", "Functional Materials", 1999, 30 (6), pp. 665-667. (Year: 1999).*

*Primary Examiner* — Geraldina Visconti
(74) *Attorney, Agent, or Firm* — Hoffmann & Baron, LLP

(57) ABSTRACT

The present invention discloses a liquid crystal composition comprising at least one compound of general formula I and a display device thereof. The present invention also discloses a liquid crystal display device comprising the liquid crystal composition of the present invention. The liquid crystal composition provided by the present invention has characteristics, such as a high absolute value of negative dielectric anisotropy, a high optical anisotropy, a superior low-temperature stability, a fast response speed and so forth. The liquid crystal display device comprising the liquid crystal composition of the present invention can satisfy the demand for low driving voltage and fast response.

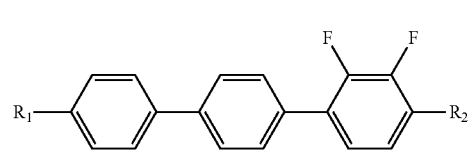

11 Claims, No Drawings

(56) References Cited

FOREIGN PATENT DOCUMENTS

| CN | 106398719 | A | 2/2017 |
|---|---|---|---|
| EP | 2 426 902 | A1 | 7/2012 |
| KR | 20150100490 | A | 9/2015 |
| TW | 482819 | B | 4/2002 |
| TW | 200927892 | A | 7/2009 |
| WO | 2016/179087 | A1 | 11/2016 |

* cited by examiner

LIQUID CRYSTAL COMPOSITION AND DISPLAY DEVICE THEREOF

CROSS-REFERENCE TO RELATED APPLICATIONS

This application is the National Stage of International Application No. PCT/CN2018/083330, filed Apr. 17, 2018, which claims the benefit of Chinese Application No. 201710253538.7, filed Apr. 18, 2017, the contents of which is incorporated by reference herein.

TECHNICAL FIELD

The present invention relates to the field of liquid crystal material, in particular to a liquid crystal composition having negative dielectric anisotropy and the display device thereof.

BACKGROUND ARTS

Liquid crystal display elements can be used in various electrical apparatuses for domestic use, measuring apparatuses, automotive panels, word processors, computers, printers, televisions and so forth, such as clocks and calculators. Based on the types of display mode, liquid crystal display elements can be classified into PC (phase change), TN (twisted nematic), STN (super twisted nematic), ECB (electrically controlled birefringence), OCB (optically compensated bend), IPS (in-plane switching), VA (vertical alignment) and so forth. Based on the driving modes of elements, liquid crystal display elements can be classified into PM (passive matrix) type and AM (active matrix) type. PM is classified into the static type, multiplex type and so forth. AM is classified into TFT (thin film transistor) type, MIM (metal insulator metal) type and so forth. The types of TFT comprise amorphous silicon and polycrystal silicon. The latter is classified into a high-temperature type and a low-temperature type according to the manufacturing process. Based on the types of light source, liquid crystal display elements are classified into a reflection type utilizing a natural light, a transmission type utilizing a backlight, and a semi-transmission type utilizing both the natural light and the backlight.

Among these display modes, IPS mode, ECB mode, VA mode, CSH mode or the like differ from the commonly used TN mode or STN mode in that the former uses a liquid crystal material having negative dielectric anisotropy. Among these display modes, in particular, as compared to conventional TN mode, VA mode has an excellent contrast ratio at dark state, which is less dependent on the birefringence of the liquid crystal, the thickness of the liquid crystal layer and the wavelength of the incident light, and has a good performance on wide viewing angle. Furthermore, the process of rubbing can also be omitted in VA mode, resulting in an increase in yield. For VA display mode, the liquid crystal composition is generally required to have a larger absolute value of negative dielectric anisotropy, a higher clearing point, a lower threshold voltage, a faster response time, and a superior low-temperature stability.

However, it is difficult in the prior art to obtain a liquid crystal composition having a large optical anisotropy, a large absolute value of negative dielectric anisotropy, a superior low-temperature stability and a fast response. A liquid crystal composition having a large absolute value of dielectric anisotropy has a high critical voltage, a high power consumption, and a relatively slow response speed. Therefore, in order to meet the increasing demand for applications, there is a need in the art for constantly improving the liquid crystal compounds with negative dielectric anisotropy.

SUMMARY OF THE INVENTION

Objects: In view of the deficiencies in the prior art, it is an object of the present invention to provide a liquid crystal composition having a high optical anisotropy, a high absolute value of negative dielectric anisotropy, a superior low-temperature stability and a fast response speed, and a display device thereof.

Technical solutions of the present invention:

A liquid crystal composition comprising:

at least one compound of general formula I

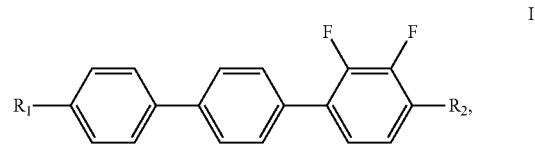

in which, $R_1$ and $R_2$ each independently represents $C_{1-12}$ alkyl or alkoxy, or $C_{2-12}$ alkenyl or alkenoxy, wherein one or more nonadjacent —$CH_2$— in the alkyl or alkoxy and the alkenyl or alkenoxy can each be independently replaced by —O— in a manner that oxygen atoms are not directly connected.

Further, in some embodiments of the present invention, $R_2$ represents $C_{1-12}$ alkoxy or $C_{2-12}$ alkenoxy, one or more nonadjacent —$CH_2$— in the $C_{1-12}$ alkoxy or $C_{2-12}$ alkenoxy can each be independently replaced by —O— in a manner that oxygen atoms are not directly connected.

Further, in some embodiments of the present invention, the liquid crystal composition comprises at least two compounds of general formula I, and the compound of general formula I provides 1-35 wt % of the total weight of the liquid crystal composition.

Further, in some embodiments of the present invention, the compound of general formula I is selected from a group consisting of the following compounds:

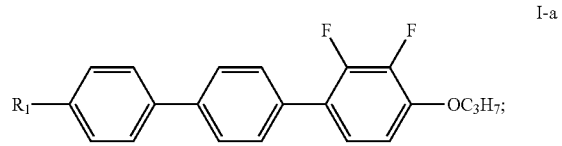

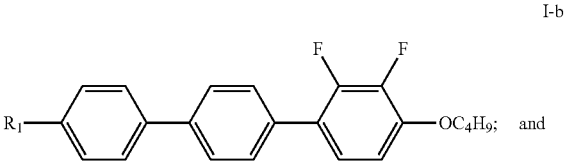

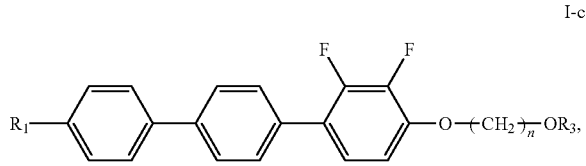

in which, $R_3$ represents $C_{1-7}$ alkyl or $C_{2-7}$ alkenyl;

n represents an integer of 2-6.

At least two compounds of general formula I are selected from a group consisting of the following compounds:

I-1
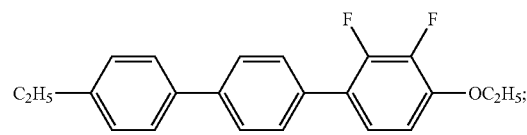

I-2
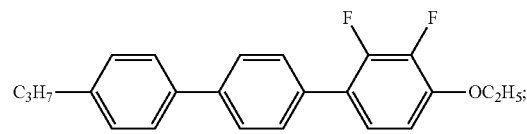

I-3
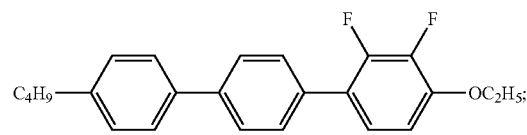

I-4
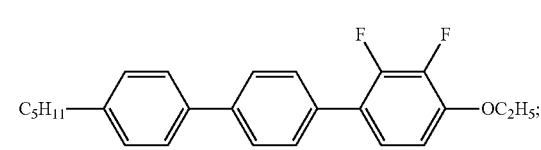

I-a-1
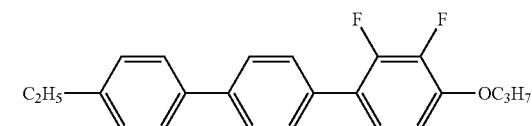

I-a-2
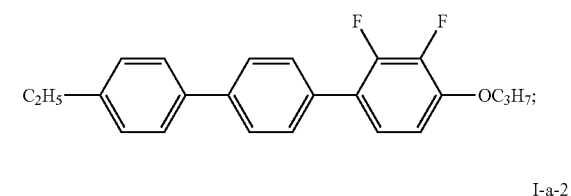

I-a-3
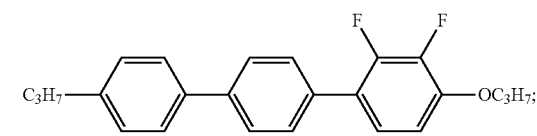

I-a-4
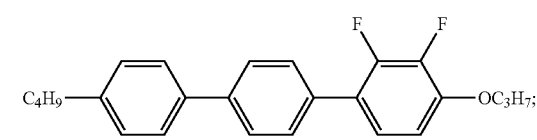

I-b-1
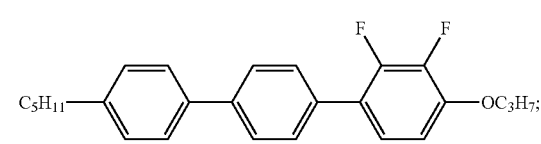

I-b-2
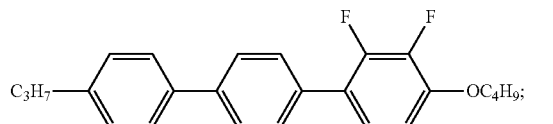

I-b-3
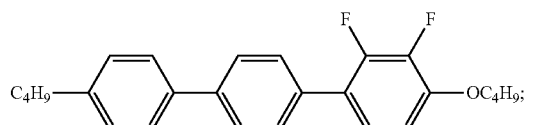

I-b-4
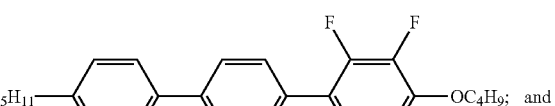

I-c
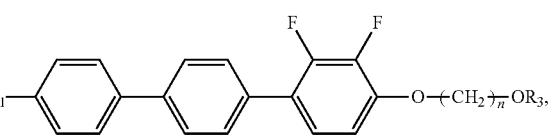

and
at least one compound of general formula I is selected from a group consisting of compounds of formulas I-a-1 to I-a-4, I-b-1 to I-b-4 and I-c.

Further, in some embodiments of the present invention, the liquid crystal composition comprises at least two compounds of general formula I, and the compound of general formula I provides 5-30 wt % of the total weight of the liquid crystal composition.

Further, in some embodiments of the present invention, the compound of general formula I is selected from a group consisting of the following compounds:

I-a
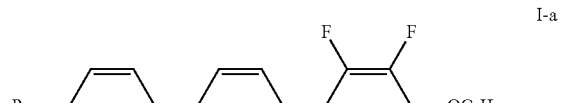

I-b
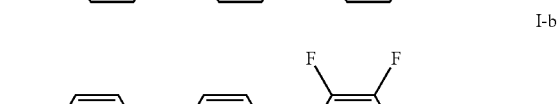

I-c
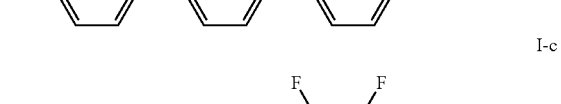

in which,
$R_3$ represents $C_{1-7}$ alkyl or $C_{2-7}$ alkenyl;
n represents an integer of 2-6; and
the compound of general formula I provides 1-35 wt % of the total weight of the liquid crystal composition.

Further, in some embodiments of the present invention, the compound of general formula I is selected from a group consisting of the following compounds:

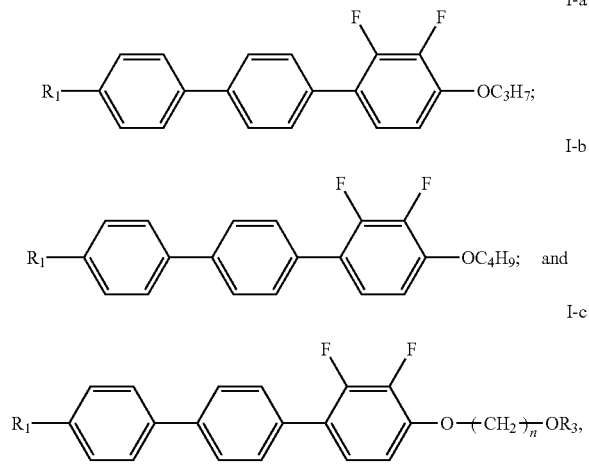

in which, $R_3$ represents $C_{1-7}$ alkyl or $C_{2-7}$ alkenyl;

n represents an integer of 2-6; and the compound of general formula I provides 5-30 wt % of the total weight of the liquid crystal composition.

Further, in some embodiments of the present invention, the liquid crystal composition further comprises at least one compound of general formula II

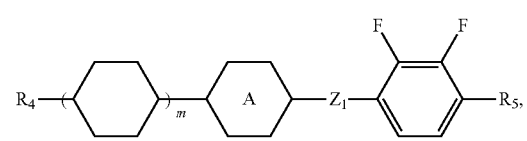

in which, $R_4$ and $R_5$ each independently represents $C_{1-12}$ alkyl or alkoxy, or $C_{2-12}$ alkenyl or alkenoxy, wherein one or more nonadjacent —$CH_2$— in the alkyl or alkoxy and the alkenyl or alkenoxy can each be independently replaced by —O— in a manner that oxygen atoms are not directly connected; ring

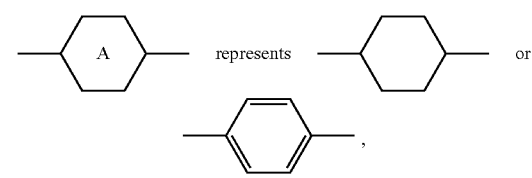

one or more —$CH_2$— in the

can be replaced by —O—, one or more H on the

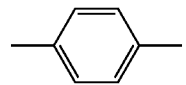

can be substituted by F;

$Z_1$ represents single bond, —$CH_2O$—, —$CF_2O$— or —COO—;

m represents 0 or 1.

Further, the compound of general formula II is selected from a group consisting of the following compounds:

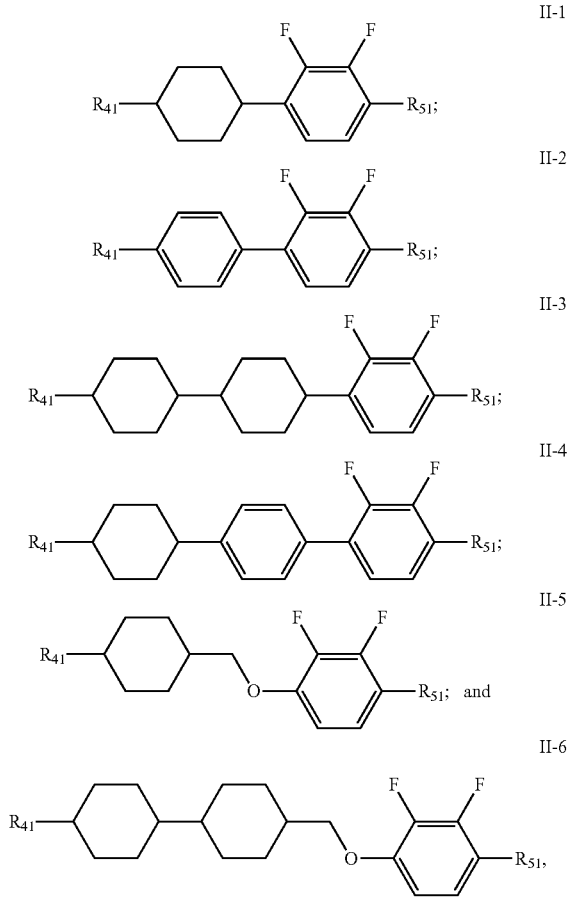

in which, $R_{41}$ and $R_{51}$ each independently represents $C_{1-7}$ alkyl or alkoxy, or $C_{2-7}$ alkenyl or alkenoxy, wherein one or more nonadjacent —$CH_2$— in the alkyl or alkoxy and the alkenyl or alkenoxy can each be independently replaced by —O— in a manner that oxygen atoms are not directly connected.

Further, the compound of general formula II-1 is selected from a group consisting of the following compounds:

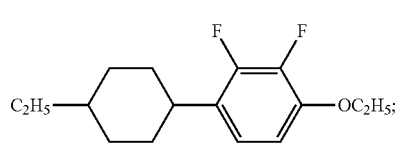

II-1-2: C₃H₇–[cyclohexyl]–[2,3-difluorophenyl]–OC₂H₅;

II-1-3: C₄H₉–[cyclohexyl]–[2,3-difluorophenyl]–OC₂H₅;

II-1-4: C₅H₁₁–[cyclohexyl]–[2,3-difluorophenyl]–OC₂H₅;

II-1-5: C₂H₅–[cyclohexyl]–[2,3-difluorophenyl]–OC₃H₇;

II-1-6: C₃H₇–[cyclohexyl]–[2,3-difluorophenyl]–OC₃H₇;

II-1-7: C₄H₉–[cyclohexyl]–[2,3-difluorophenyl]–OC₃H₇;

II-1-8: C₅H₁₁–[cyclohexyl]–[2,3-difluorophenyl]–OC₃H₇;

II-1-9: C₂H₅–[cyclohexyl]–[2,3-difluorophenyl]–OC₄H₉;

II-1-10: C₃H₇–[cyclohexyl]–[2,3-difluorophenyl]–OC₄H₉;

II-1-11: C₄H₉–[cyclohexyl]–[2,3-difluorophenyl]–OC₄H₉; and

II-1-12: C₅H₁₁–[cyclohexyl]–[2,3-difluorophenyl]–OC₄H₉, the compound of general formula II-2 is selected from a group consisting of the following compounds:

II-2-1: C₂H₅–[phenyl]–[2,3-difluorophenyl]–OC₂H₅;

II-2-2: C₃H₇–[phenyl]–[2,3-difluorophenyl]–OC₂H₅;

II-2-3: C₄H₉–[phenyl]–[2,3-difluorophenyl]–OC₂H₅;

II-2-4: C₅H₁₁–[phenyl]–[2,3-difluorophenyl]–OC₂H₅;

II-2-5: C₂H₅–[phenyl]–[2,3-difluorophenyl]–OC₃H₇;

II-2-6: C₃H₇–[phenyl]–[2,3-difluorophenyl]–OC₃H₇;

II-2-7: C₄H₉–[phenyl]–[2,3-difluorophenyl]–OC₃H₇;

II-2-8: C₅H₁₁–[phenyl]–[2,3-difluorophenyl]–OC₃H₇;

II-2-9: C₂H₅–[phenyl]–[2,3-difluorophenyl]–OC₄H₉;

II-2-10: C₃H₇–[phenyl]–[2,3-difluorophenyl]–OC₄H₉;

II-2-11: C₄H₉–[phenyl]–[2,3-difluorophenyl]–OC₄H₉; and

II-2-12
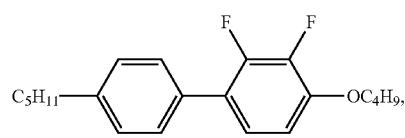
the compound of general formula II-3 is selected from a group consisting of the following compounds:
II-3-1
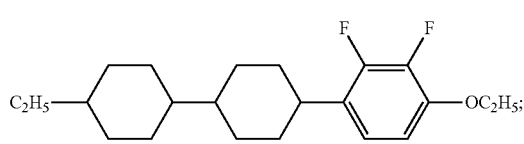
II-3-2
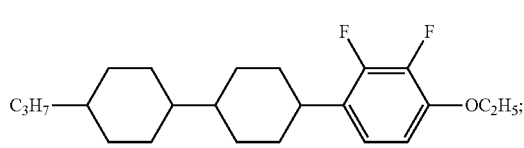
II-3-3
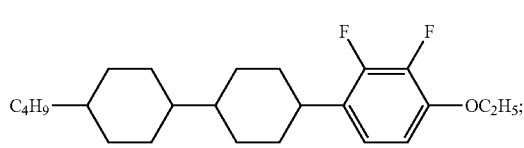
II-3-4
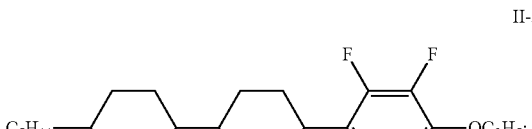
II-3-5
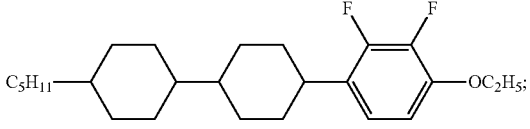
II-3-6
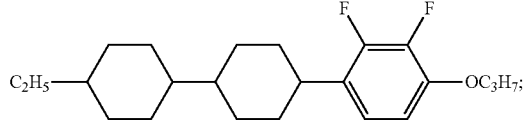
II-3-7
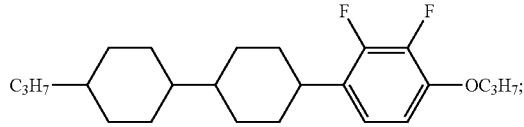
II-3-8
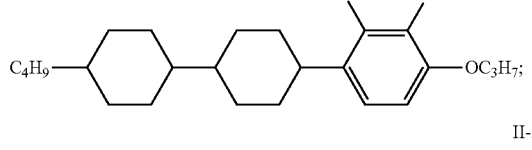
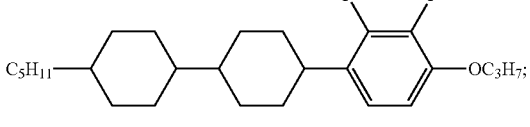
II-3-9
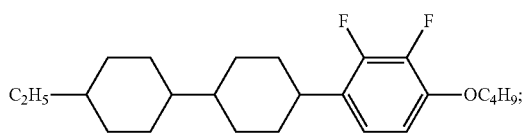
II-3-10
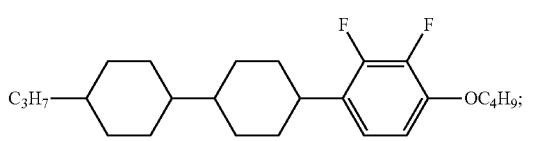
II-3-11
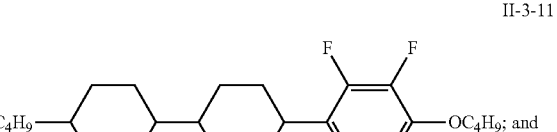
II-3-12
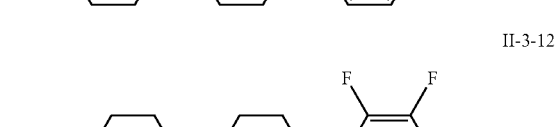
the compound of general formula II-4 is selected from a group consisting of the following compounds:
II-4-1
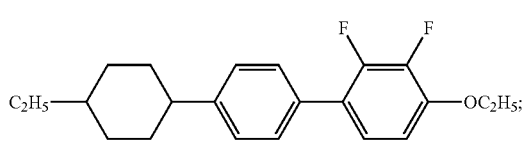
II-4-2
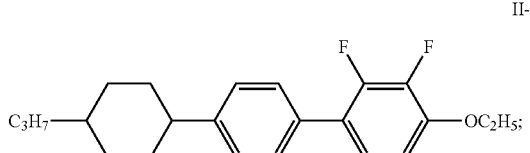
II-4-3
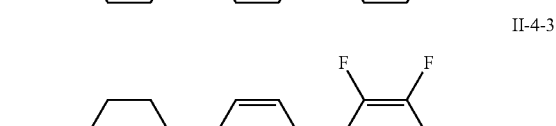
II-4-4
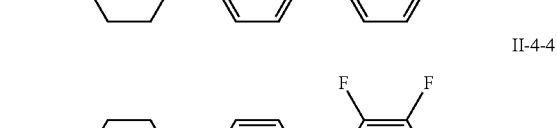
II-4-5
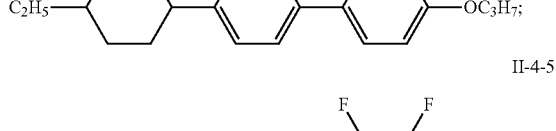
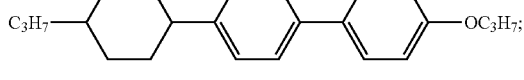

-continued
II-4-6
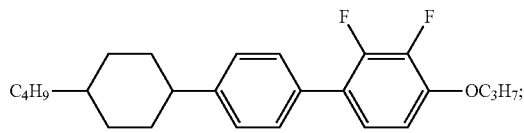
II-4-7
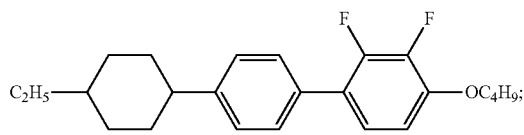
II-4-8
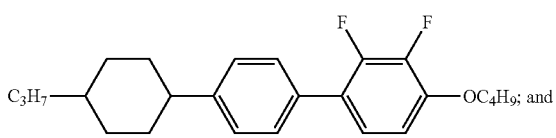
II-4-9
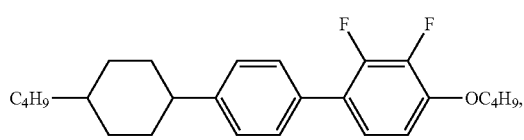
the compound of general formula II-5 is selected from a group consisting of the following compounds:
II-5-1
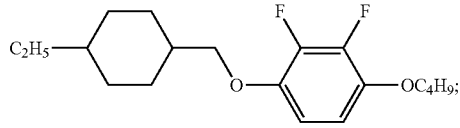
II-5-2
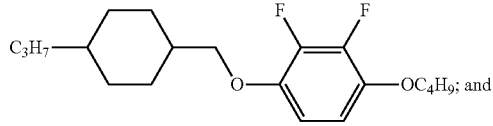
II-5-3
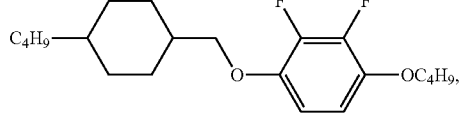
II-5-4
II-5-5
II-5-6
II-5-7
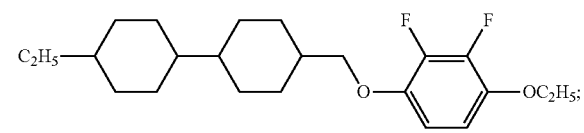
II-5-8
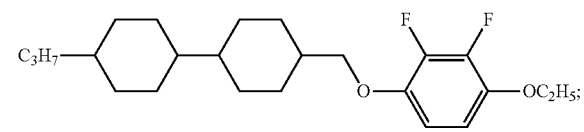
II-5-9
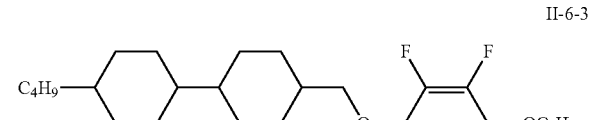
the compound of general formula II-6 is selected from a group consisting of the following compounds:
II-6-1
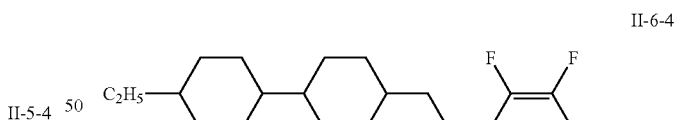
II-6-2
II-6-3
II-6-4
II-6-5
II-6-6
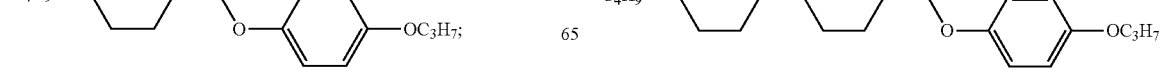

-continued

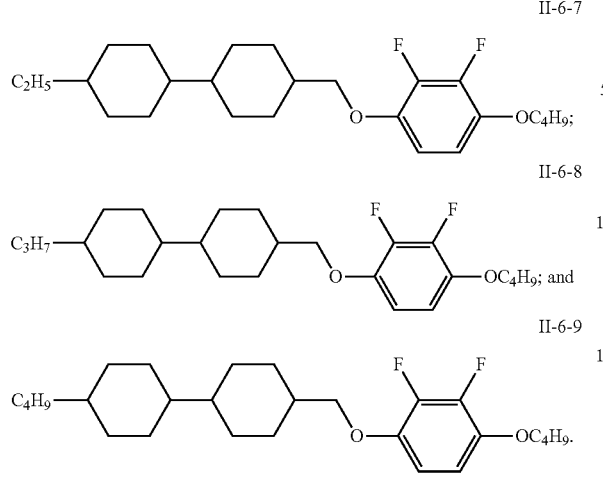

Further, in some embodiments of the present invention, the liquid crystal composition further comprises at least one compound of general formula III

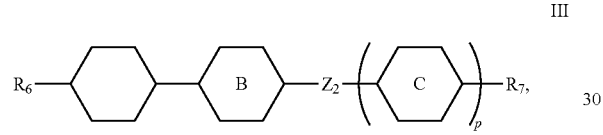

in which, $R_6$ and $R_7$ each independently represents $C_{1-12}$ alkyl or alkoxy, or $C_{2-12}$ alkenyl or alkenoxy, wherein one or more nonadjacent —$CH_2$— in the alkyl or alkoxy and the alkenyl or alkenoxy can each be independently replaced by —O— in a manner that oxygen atoms are not directly connected;

ring

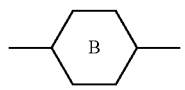

and ring

each independently represents

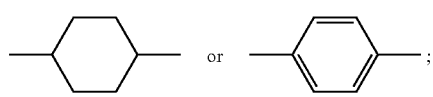

$Z_2$ represents single bond, —$CH_2O$—, —$CF_2O$— or —COO—;

p represents 0 or 1.

Further, the compound of general formula III is selected from a group consisting of the following compounds:

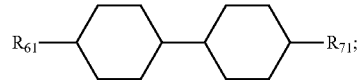

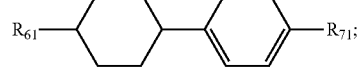

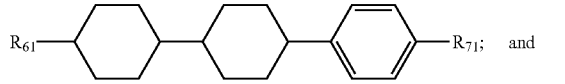

in which, $R_{61}$ and $R_{71}$ each independently represents $C_{1-7}$ alkyl or alkoxy, or $C_{2-7}$ alkenyl or alkenoxy, wherein one or more nonadjacent —$CH_2$— in the alkyl or alkoxy and the alkenyl or alkenoxy can each be independently replaced by —O— in a manner that oxygen atoms are not directly connected.

Further, the compound of general formula III-1 is selected from a group consisting of the following compounds:

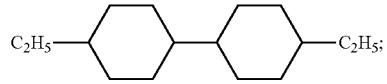

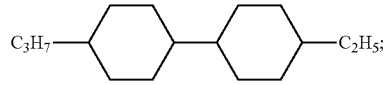

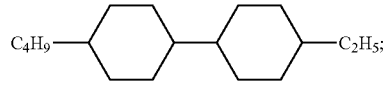

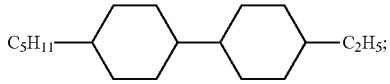

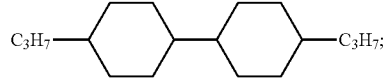

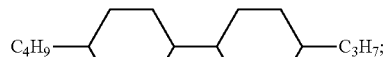

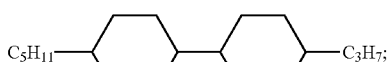

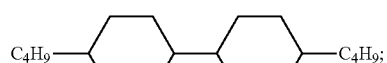

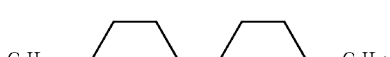

-continued
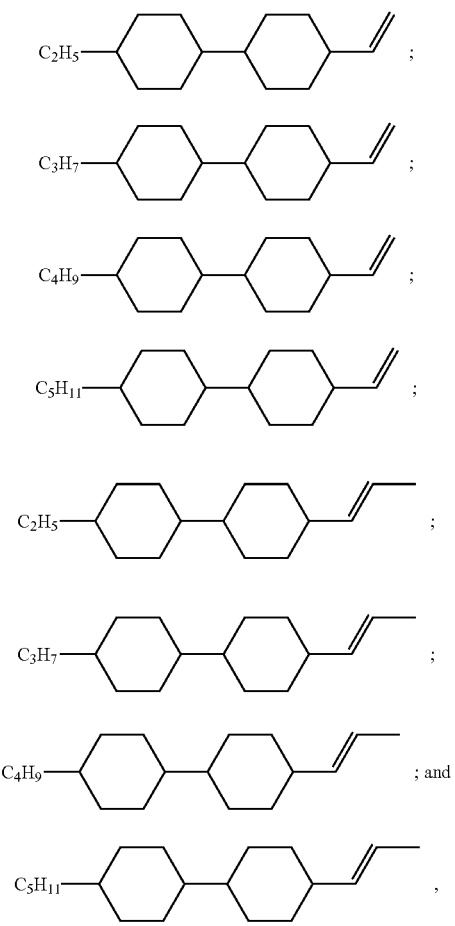
the compound of general formula III-2 is selected from a group consisting of the following compounds:
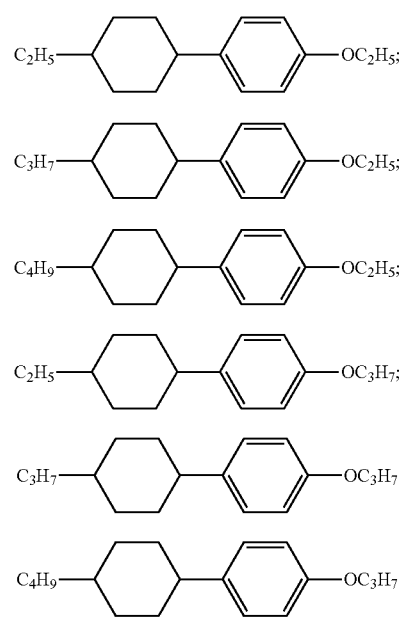
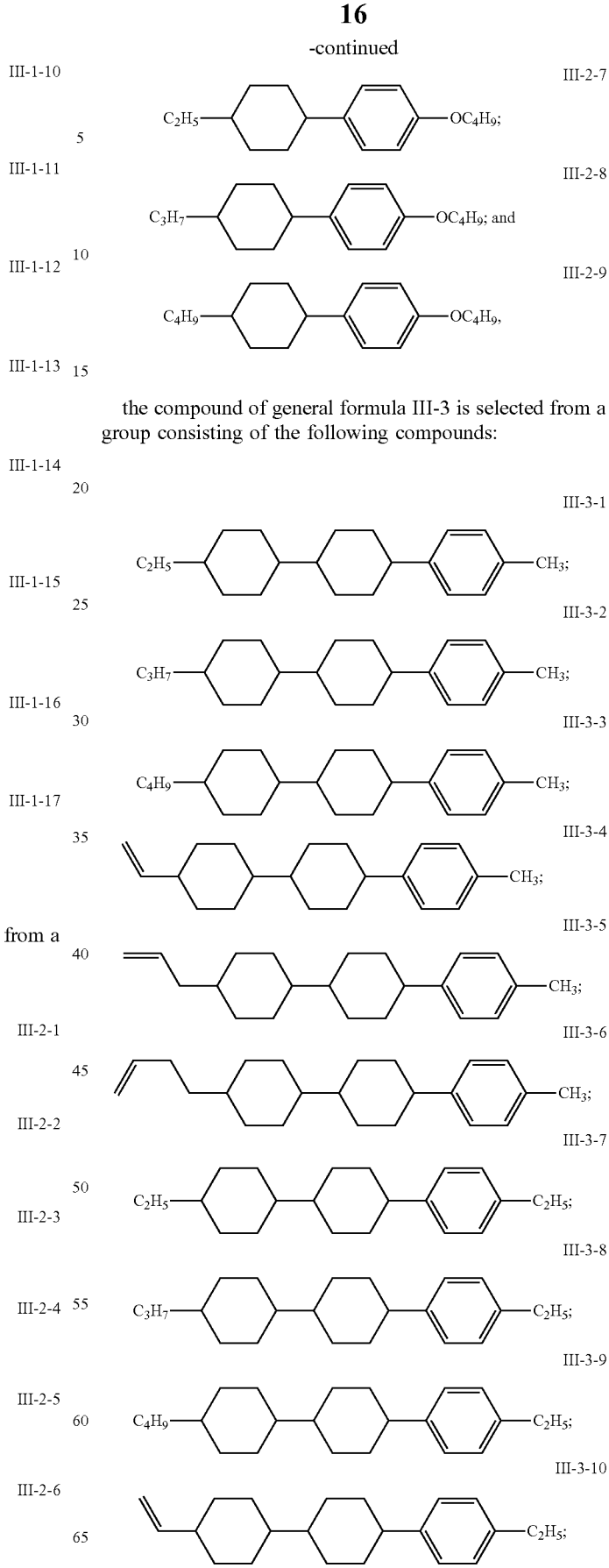
the compound of general formula III-3 is selected from a group consisting of the following compounds:

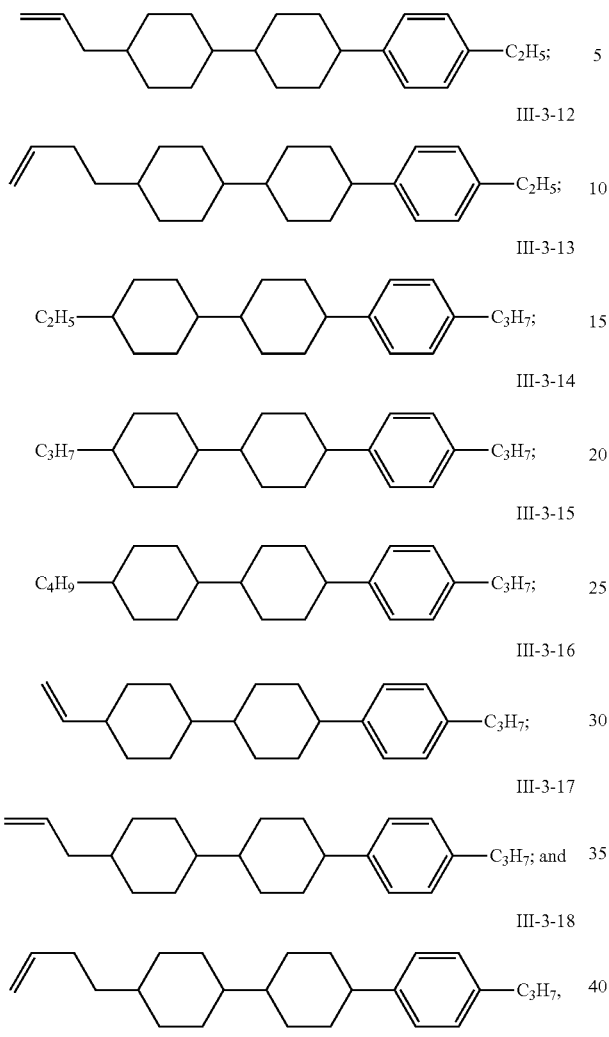
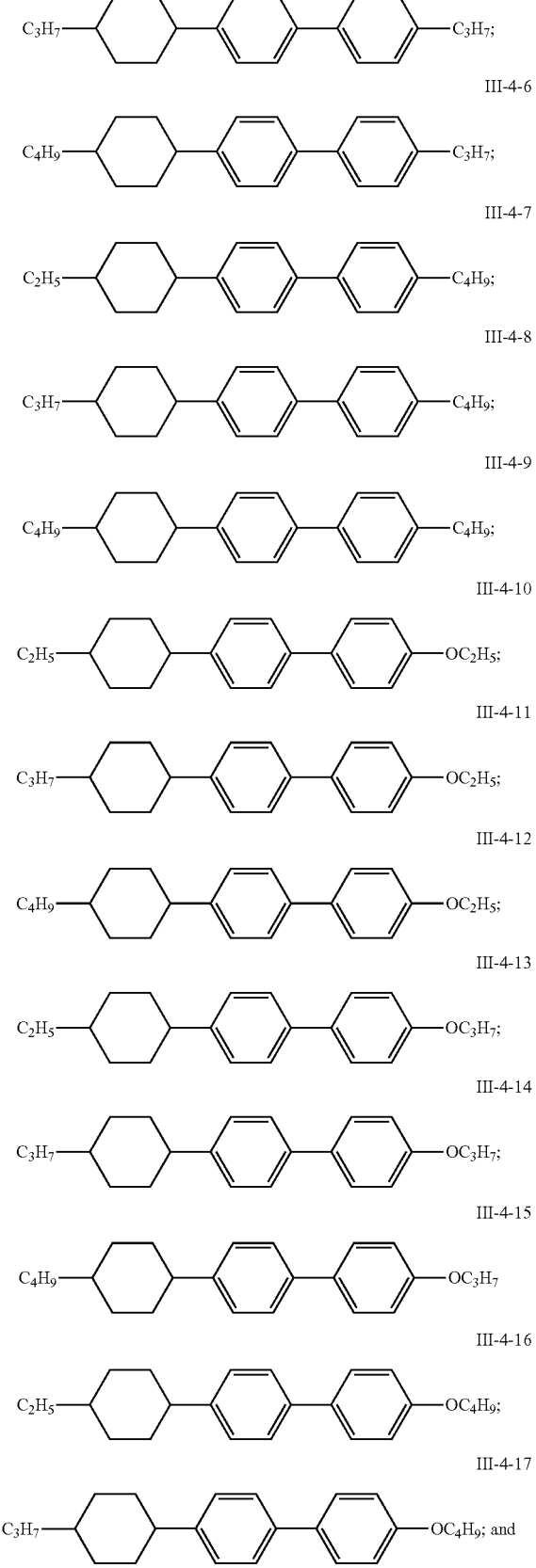
the compound of general formula III-4 is selected from a group consisting of the following compounds:

-continued

III-4-18

A liquid crystal display device comprising the liquid crystal compositions above is provided.

Further, the liquid crystal composition also comprises one or more additives known to those skilled in the art and described in the literatures.

Stabilizers which can be added, for example, to the mixture according to the present invention are mentioned below.

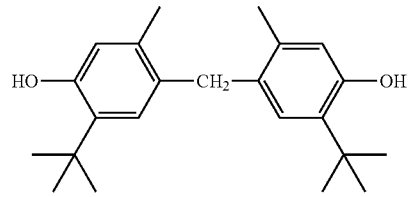
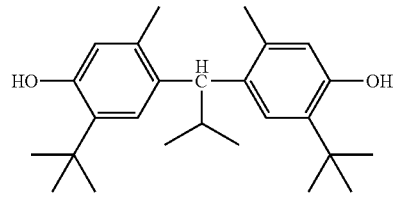
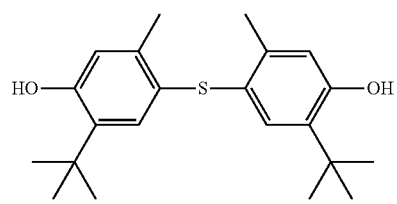
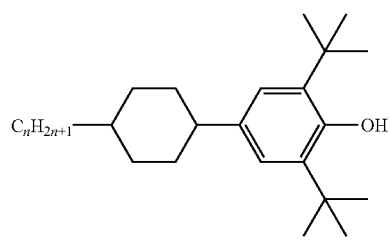
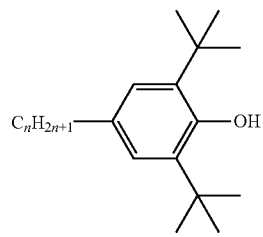
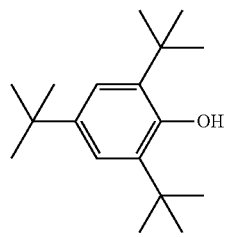
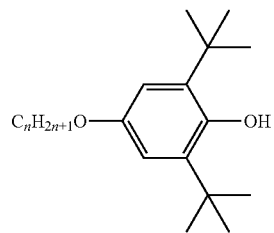
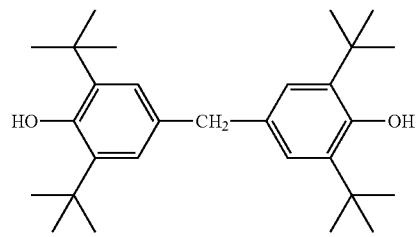
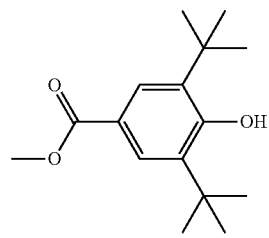
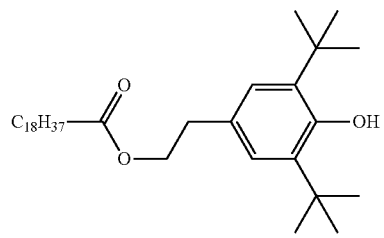
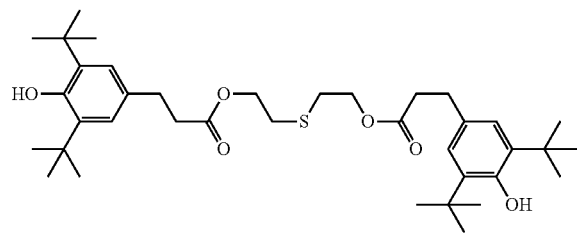
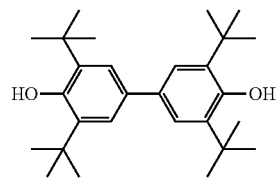

21
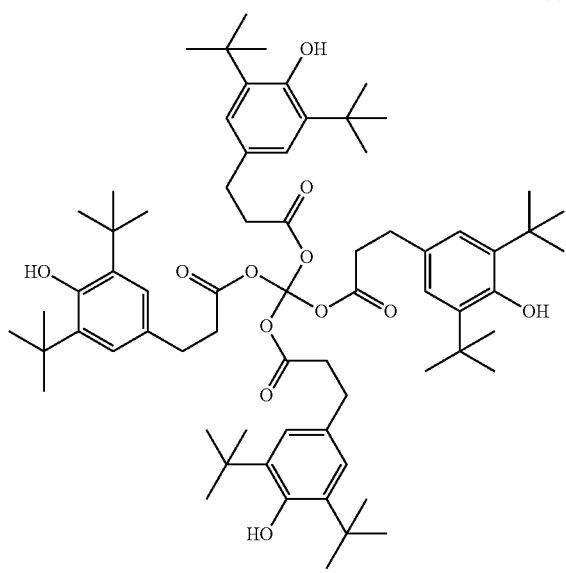
22
-continued
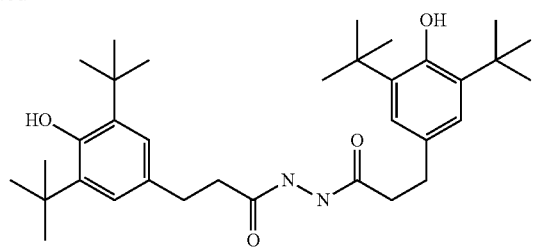
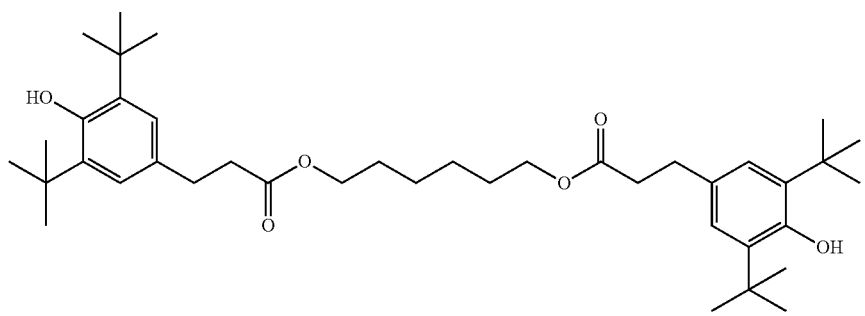
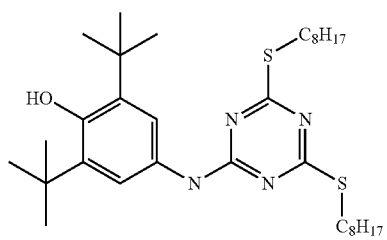
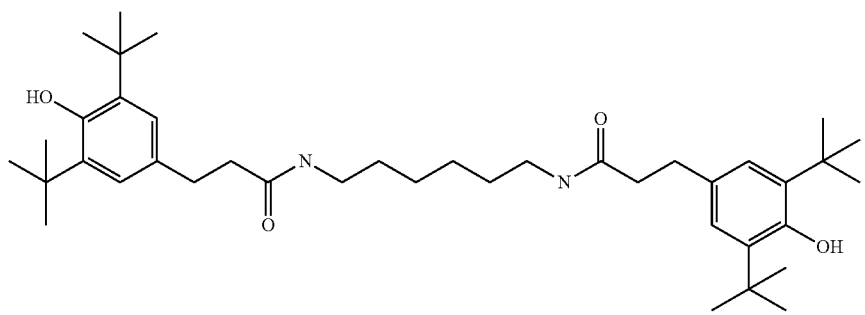

23
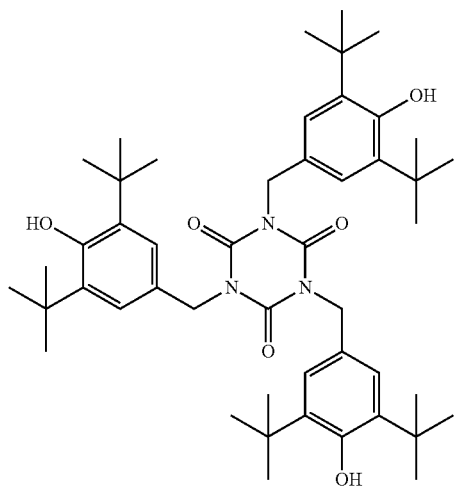
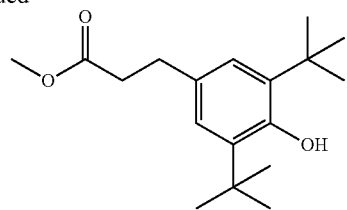
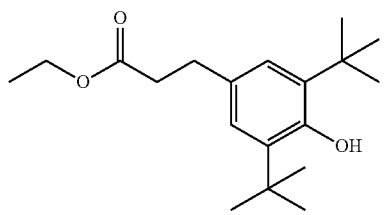
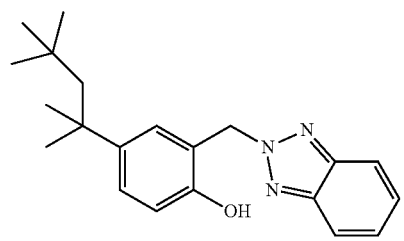
24
-continued
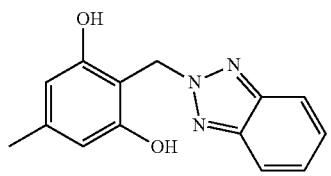
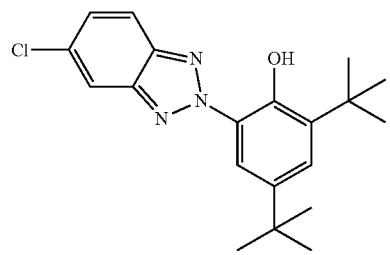
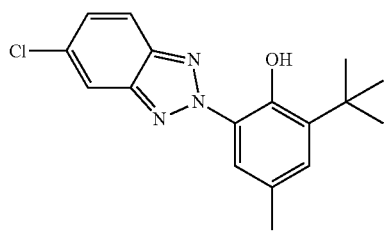
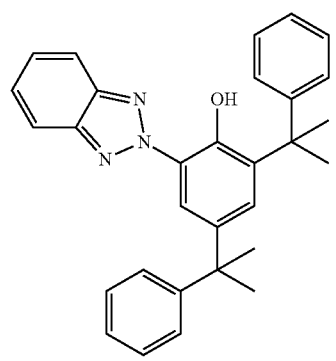
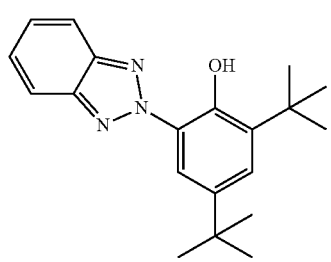
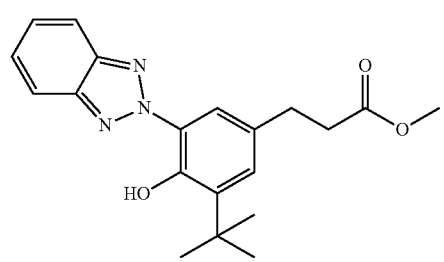

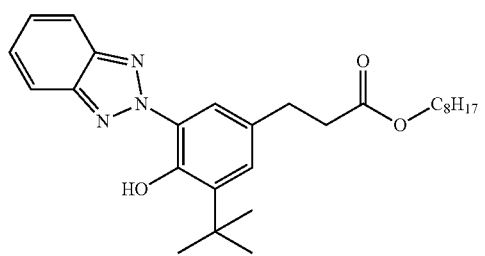
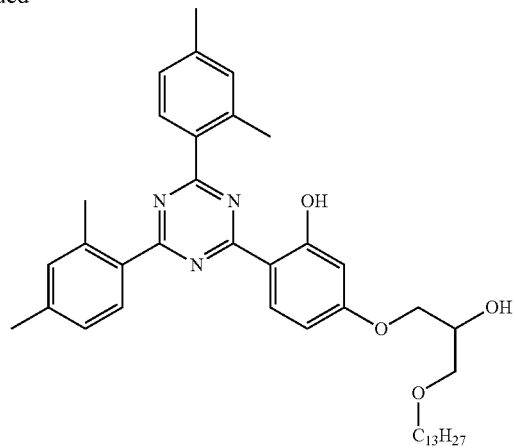
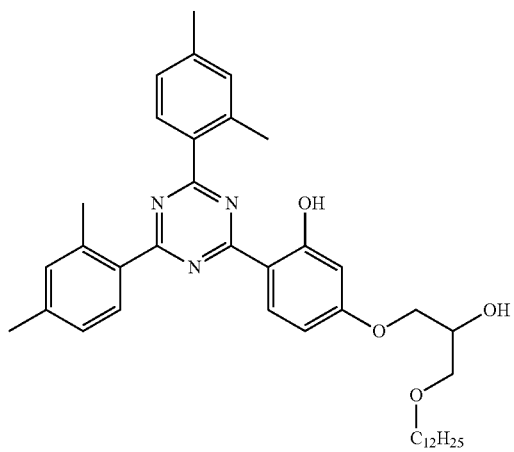
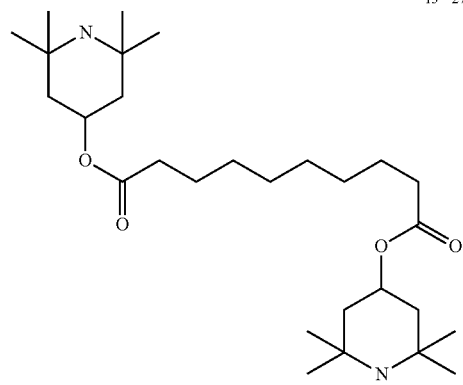
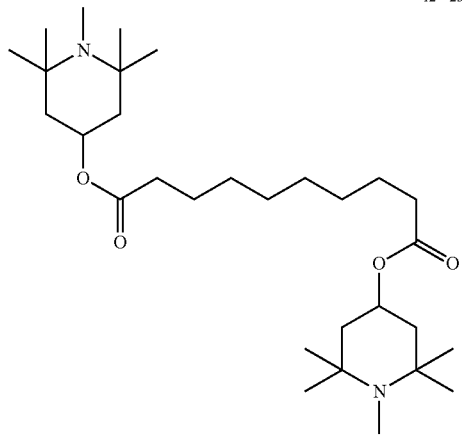
Preferably, the stabilizer is selected from stabilizers as shown below.
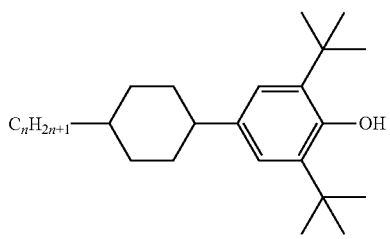
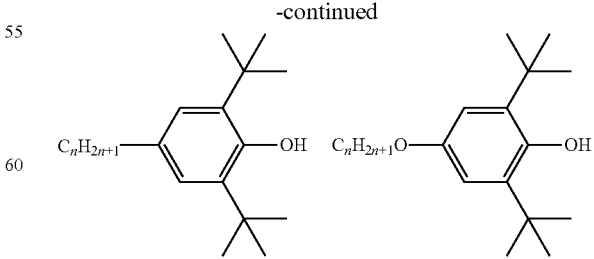
In the embodiments of the present invention, preferably, the stabilizer provides 0-5 wt % of the total weight of the liquid crystal composition; more preferably, the stabilizer provides 0-1 wt % of the total weight of the liquid crystal composition; as a particularly preferred embodiment, the stabilizer provides 0.01-0.1 wt % of the total weight of the liquid crystal composition.

In still another aspect, the present invention provides a liquid crystal display device comprising the liquid crystal composition provided by the present invention.

Beneficial Effects:

The liquid crystal composition provided by the present invention has characteristics, such as a high absolute value of negative dielectric anisotropy, a high optical anisotropy, a superior low-temperature stability, a fast response speed and so forth. The liquid crystal display device comprising the liquid crystal composition of the present invention can satisfy the demand for low driving voltage and fast response.

DETAILED EMBODIMENTS

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

Unless specifically indicated, in the present invention, all ratios are weight ratios, and all temperatures are degree centigrade.

For the convenience of the expression, the group structures of the liquid crystal compositions in the following Examples are represented by the codes listed in Table 1:

TABLE 1

Codes of the group structures of liquid crystal compounds

| Unit structure of group | Code | Name of group |
|---|---|---|
| (cyclohexane) | C | 1,4-cyclohexylidene |
| (benzene) | P | 1,4-phenylene |
| (2-fluorobenzene) | G | 2-fluoro-1,4-phenylene |
| (2,3-difluorobenzene) | W | 2,3-difluoro-1,4-phenylene |
| —CH$_2$CH$_2$— | 2 | ethyl bridge bond |
| —OCF$_3$ | OCF3 | trifluoromethoxy |
| —F | F | fluorine substituent |
| —O— | O | oxygen substituent |
| —CF$_2$O— | Q | difluoro ether group |
| —COO— | E | ester bridge bond |
| —C$_n$H$_{2n+1}$ or —C$_m$H$_{2m+1}$ | n or m | alkyl |
| —CH=CH— or —CH=CH$_2$ | V | alkenyl |

Take the compound with following structural formula as an example:

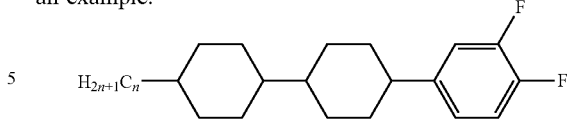

Represented by the codes listed in Table 1, this structural formula can be expressed as nCCGF, in which, n in the code represents the number of the carbon atoms of the alkyl on the left, for example, n is "3", meaning that the alkyl is —C$_3$H$_7$; C in the code represents cyclohexyl, G represents 2-fluoro-1,4-phenylene, and F represents fluoro.

The abbreviated codes of the test items in the following Examples are as follows:
  Cp (° C.) clearing point (nematic-isotropy phases transition temperature)
  Δn optical anisotropy (589 nm, 25° C.)
  Δε dielectric anisotropy (1 KHz, 25° C.)
  γ1 rotational viscosity (mPa*s, at 25° C.)
  t(−30° C.) low-temperature storage time (h, at −30° C.)

In which, the optical anisotropy is tested and obtained by using abbe refractometer under sodium lamp (589 nm) light source at 25° C.

$\Delta\varepsilon = \varepsilon_\parallel - \varepsilon_\perp$, in which, $\varepsilon_\parallel$ is a dielectric constant parallel to the molecular axis, $\varepsilon_\perp$ is a dielectric constant perpendicular to the molecular axis, with the test conditions: 25° C., 1 KHz, TN90 type test cell with a cell gap of 7 μm.

γ1 is tested and obtained by the TOYO6254 type liquid crystal physical property evaluation system; the test temperature is 25° C., and the test voltage is 90 V.

The ingredients used in the following Examples can be synthesized by well-known methods or obtained by commercial means. These synthetic techniques are routine, and the test results show that the liquid crystal compounds thus prepared meet the criteria for the electronic compounds.

The liquid crystal compositions are prepared according to the formulations of the liquid crystal compositions specified in the following Examples. The preparation of the liquid crystal compositions is proceeded according to the conventional methods in the art, and as an example, the compositions are prepared by mixing the specified formulation via the processing modes, such as heating, ultrasonic processing, suspending processing and so forth.

The liquid crystal composition specified in the following Examples are prepared and studied. The formulas of the liquid crystal compositions and their test results for the performance are shown below.

Comparative Example 1

The liquid crystal composition of Comparative Example 1 is prepared according to each compound and weight percentage listed in Table 2 and is tested by filling the same between two substrates of a liquid crystal display device. The test data are shown in the Table below:

TABLE 2

Formulation and test performances of liquid crystal composition

| Code of component | Code of structure | weight percent | Test results for the performance parameters | |
|---|---|---|---|---|
| 3CWO4 | II-1-10 | 15 | Cp | 95 |
| 5CWO4 | II-1-12 | 10 | Δn | 0.114 |
| 3CCWO2 | II-3-2 | 15 | Δε | −3.8 |
| 3CCWO5 | | 5 | γ1 | 212 |
| 4CCWO2 | II-3-3 | 5 | t (−30° C.) | >336 |
| 5CPWO4 | | 9 | | |
| 3CCV | III-1-11 | 10 | | |
| 4CC3 | III-1-6 | 7 | | |

TABLE 2-continued

Formulation and test performances of liquid crystal composition

| Code of component | Code of structure | weight percent | Test results for the performance parameters |
|---|---|---|---|
| 3CPP2 | III-4-2 | 10 | |
| 3PWP2 | | 5 | |
| 7PGP3 | | 7 | |
| VCCP1 | III-3-4 | 2 | |
| Total | | 100 | |

Example 1

The liquid crystal composition of Example 1 is prepared according to each compound and weight percentage listed in Table 3 and is tested by filling the same between two substrates of a liquid crystal display device. The test data are shown in the Table below:

TABLE 3

Formulation and test performances of liquid crystal composition

| Code of component | Code of structure | weight percent | Test results for the performance parameters | |
|---|---|---|---|---|
| 3CWO4 | II-1-10 | 11 | Cp | 96 |
| 3CCWO4 | II-3-10 | 4 | Δn | 0.127 |
| 5CWO4 | II-1-12 | 10 | Δε | −4.9 |
| 3PPWO4 | I-b-2 | 10 | γ1 | 187 |
| VCCP1 | III-3-4 | 3 | t (−30° C.) | >1000 |
| V2CCP1 | III-3-6 | 5 | | |
| 3CCV1 | III-1-15 | 11 | | |
| 2CPWO2 | II-4-1 | 8 | | |
| 3CPWO2 | III-4-2 | 8 | | |
| 4CPWO2 | II-4-3 | 8 | | |
| 5PP1 | | 2 | | |
| 5PWO4 | II-2-12 | 5 | | |
| 3CPP2 | III-4-2 | 5 | | |
| 5CWO2 | II-1-4 | 10 | | |
| Total | | 100 | | |

Example 2

The liquid crystal composition of Example 2 is prepared according to each compound and weight percentage listed in Table 4 and is tested by filling the same between two substrates of a liquid crystal display device. The test data are shown in the Table below:

TABLE 4

Formulation and test performances of liquid crystal composition

| Code of component | Code of structure | weight percent | Test results for the performance parameters | |
|---|---|---|---|---|
| 3CWO4 | II-1-10 | 10 | Cp | 99.7 |
| 3CCWO4 | II-3-10 | 7 | Δn | 0.144 |
| 5CWO4 | II-1-12 | 9 | Δε | −5 |
| 3PPWO4 | I-b-2 | 8 | γ1 | 191 |
| V2CCP1 | III-3-6 | 5 | t (−30° C.) | >1000 |
| 3CCV | III-1-11 | 7 | | |
| 4PPWO3 | I-a-3 | 7 | | |
| 5PPWO2 | I-4 | 5 | | |
| 3CPWO2 | II-4-2 | 5 | | |
| 3CPWO4 | II-4-8 | 9 | | |
| 5PP1 | | 6 | | |
| 5PWO4 | II-2-12 | 5 | | |

TABLE 4-continued

Formulation and test performances of liquid crystal composition

| Code of component | Code of structure | weight percent | Test results for the performance parameters |
|---|---|---|---|
| 3CPP2 | III-4-2 | 8 | |
| 5CWO2 | II-1-4 | 9 | |
| Total | | 100 | |

Example 3

The liquid crystal composition of Example 3 is prepared according to each compound and weight percentage listed in Table 5 and is tested by filling the same between two substrates of a liquid crystal display device. The test data are shown in the Table below:

TABLE 5

Formulation and test performances of liquid crystal composition

| Code of component | Code of structure | weight percent | Test results for the performance parameters | |
|---|---|---|---|---|
| 3CWO4 | II-1-10 | 12 | Cp | 100 |
| 3CCWO4 | II-3-10 | 5 | Δn | 0.15 |
| 5CWO4 | II-1-12 | 8 | Δε | −4.9 |
| 3PPWO4 | I-b-2 | 8 | γ1 | 174 |
| V2CCP1 | III-3-6 | 5 | t (−30° C.) | >1000 |
| 3CCV | III-1-11 | 12 | | |
| 4PPWO3 | I-a-3 | 7 | | |
| 5PPWO2 | I-4 | 5 | | |
| 3PPWO4O1 | I-c | 5 | | |
| 3CPWO4 | II-4-8 | 4 | | |
| 5PP1 | | 3 | | |
| 3PWO4 | II-2-10 | 5 | | |
| 3CPP2 | III-4-2 | 7 | | |
| 5PPWO4 | I-b-4 | 5 | | |
| 5CWO2 | II-1-4 | 9 | | |
| Total | | 100 | | |

Example 4

The liquid crystal composition of Example 4 is prepared according to each compound and weight percentage listed in Table 6 and is tested by filling the same between two substrates of a liquid crystal display device. The test data are shown in the Table below:

TABLE 6

Formulation and test performances of liquid crystal composition

| Code of component | Code of structure | weight percent | Test results for the performance parameters | |
|---|---|---|---|---|
| 3CWO4 | II-1-10 | 9 | Cp | 96 |
| 5CCWO2 | II-3-4 | 5 | Δn | 0.128 |
| 5CWO4 | II-1-12 | 7 | Δε | −4.9 |
| 3PPWO2 | I-2 | 5 | γ1 | 201 |
| VCCP1 | III-3-4 | 3 | t (−30° C.) | >500 |
| V2CCP1 | III-3-6 | 4 | | |
| 3CCV1 | III-1-15 | 10 | | |
| 2CPWO2 | II-4-1 | 8 | | |
| 3CPWO2 | II-4-2 | 10 | | |
| 4CPWO2 | II-4-3 | 10 | | |
| 5PP1 | | 3 | | |
| 5PWO4 | II-2-12 | 10 | | |
| 3CPP2 | III-4-2 | 6 | | |
| 5CWO2 | II-1-4 | 10 | | |
| Total | | 100 | | |

Example 5

The liquid crystal composition of Example 5 is prepared according to each compound and weight percentage listed in Table 7 and is tested by filling the same between two substrates of a liquid crystal display device. The test data are shown in the Table below:

TABLE 7

Formulation and test performances of liquid crystal composition

| Code of component | Code of structure | weight percent | Test results for the performance parameters | |
|---|---|---|---|---|
| 3CWO4 | II-1-10 | 9 | Cp | 96 |
| 5CCWO2 | II-3-4 | 5 | Δn | 0.128 |
| 5CWO4 | II-1-12 | 7 | Δε | −4.9 |
| 3PPWO2 | I-2 | 2 | γ1 | 203 |
| VCCP1 | III-3-4 | 3 | t (−30° C.) | >1000 |
| V2CCP1 | III-3-6 | 4 | | |
| 3CCV1 | III-1-15 | 10 | | |
| 2CPWO2 | II-4-1 | 8 | | |
| 3CPWO2 | II-4-2 | 10 | | |
| 4CPWO2 | II-4-3 | 10 | | |
| 5PP1 | | 3 | | |
| 5PWO4 | II-2-12 | 10 | | |
| 3CPP2 | III-4-2 | 6 | | |
| 5PPWO2 | I-4 | 3 | | |
| 5CWO2 | II-1-4 | 10 | | |
| Total | | 100 | | |

It can be seen from the test data of the above Examples that the liquid crystal composition provided by the present invention has characteristics, such as a high absolute value of negative dielectric anisotropy, a high optical anisotropy, a superior low-temperature stability, a fast response speed and so forth. The liquid crystal display device comprising the liquid crystal composition of the present invention can satisfy the demand for low driving voltage and fast response.

The above embodiments are merely illustrative of the technical concepts and features of the present invention, and provided for facilitating the understanding and practice of the present invention by those skilled in the art. However, the protection scope of the invention is not limited thereto. Equivalent variations or modifications made without departing from the spirit and essence of the present invention are intended to be contemplated within the protection scope of the present invention.

INDUSTRIAL APPLICABILITY

The liquid crystal composition related in the present invention can be applied to the field of liquid crystal.

The invention claimed is:

1. A liquid crystal composition, wherein the liquid crystal composition comprises:
at least one compound selected from a group consisting of the following compounds:

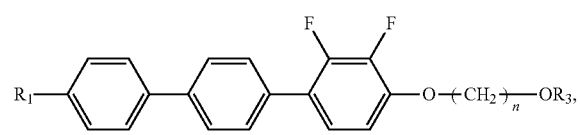

I-c in which,
$R_1$ represent $C_{1-12}$ alkyl or alkoxy, or $C_{2-12}$ alkenyl or alkenoxy, wherein one or more nonadjacent —CH$_2$— in the alkyl or alkoxy and the alkenyl or alkenoxy can each be independently replaced by —O— in a manner that oxygen atoms are not directly connected;
$R_3$ represents $C_{1-7}$ alkyl or $C_{2-7}$ alkenyl;
n represents an integer of 2-6.

2. A liquid crystal composition, wherein the liquid crystal composition comprises:
(a) at least one compound selected from a group consisting of the following compounds:

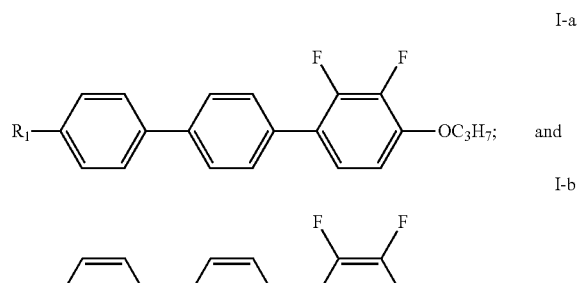

(b) at least one compound selected from a group consisting of the following compounds:

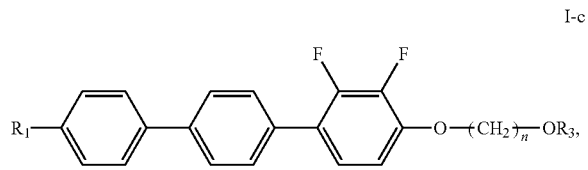

in which,
$R_1$ represent $C_{1-12}$ alkyl or alkoxy, or $C_{2-12}$ alkenyl or alkenoxy, wherein one or more nonadjacent —CH$_2$— in the alkyl or alkoxy and the alkenyl or alkenoxy can each be independently replaced by —O— in a manner that oxygen atoms are not directly connected;
$R_3$ represents $C_{1-7}$ alkyl or $C_{2-7}$ alkenyl; and
n represents an integer of 2-6.

3. The liquid crystal composition according to claim 2, wherein the at least one compound selected from general formulas I-a and I-b and the at least one compound selected from formula I-c provide from 1 wt % to 35 wt % of the total weight of the liquid crystal composition.

4. The liquid crystal composition according to claim 2, wherein at least one compound selected from general formulas I-a and I-b and the at least one compound selected from formula I-c are selected from a group consisting of the following compounds:

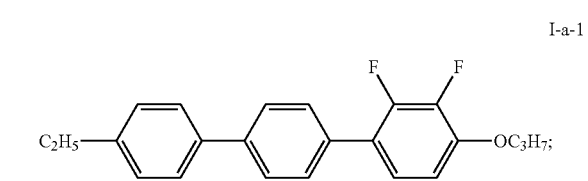

-continued

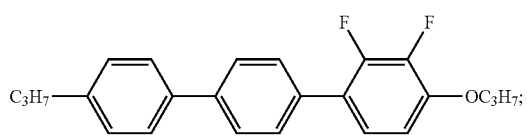
I-a-2

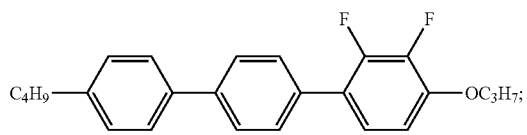
I-a-3

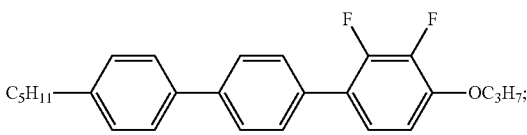
I-a-4

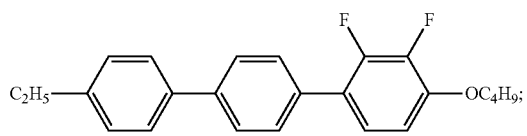
I-b-1

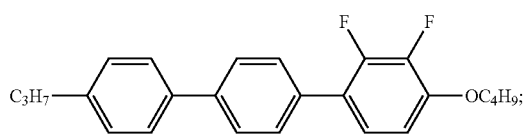
I-b-2

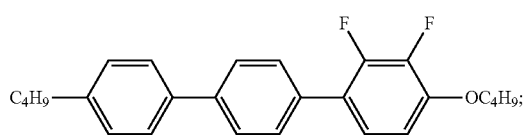
I-b-3

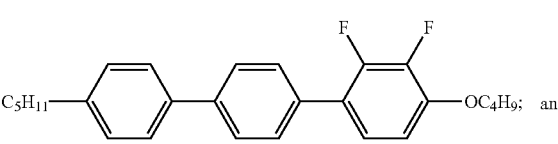
I-b-4

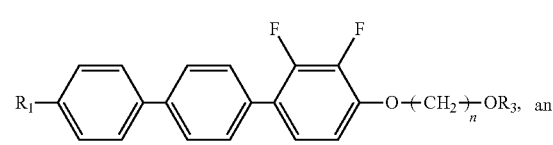
I-c in which, $R_1$ represent $C_{1-12}$ alkyl or alkoxy, or $C_{2-12}$ alkenyl or alkenoxy, wherein one or more nonadjacent —$CH_2$— in the alkyl or alkoxy and the alkenyl or alkenoxy can each be independently replaced by —O— in a manner that oxygen atoms are not directly connected;

$R_3$ represents $C_{1-7}$ alkyl or $C_{2-7}$ alkenyl; and n represents an integer of 2-6.

5. The liquid crystal composition according to claim 3, wherein the at least one compound selected from general formulas I-a and I-b and the at least one compound selected from formula I-c provides from 5 wt % to 30 wt % of the total weight of the liquid crystal composition.

6. The liquid crystal composition according to claim 5, wherein the liquid crystal composition further comprises at least one compound of general formula II

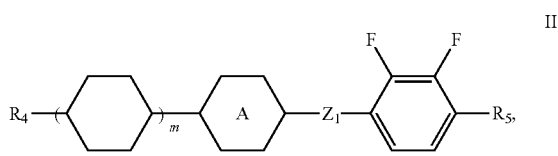
II in which, $R_4$ and $R_5$ each independently represents $C_{1-12}$ alkyl or alkoxy, or $C_{2-12}$ alkenyl or alkenoxy, wherein one or more nonadjacent —$CH_2$— in the alkyl or alkoxy and the alkenyl or alkenoxy can each be independently replaced by —O— in a manner that oxygen atoms are not directly connected; ring

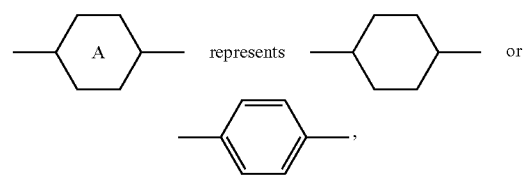

one or more —$CH_2$— in the

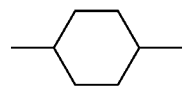

can be replaced by —O—, one or more H on the

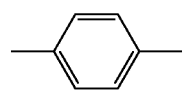

can be substituted by F;

$Z_1$ represents single bond, —$CH_2O$—, —$CF_2O$— or —COO—;

m represents 0 or 1.

7. The liquid crystal composition according to claim 1, wherein the liquid crystal composition further comprises at least one compound of general formula II

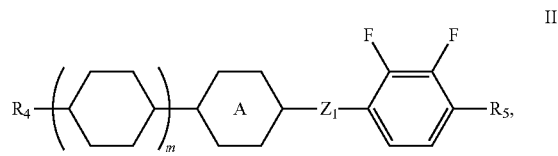
II in which, $R_4$ and $R_5$ each independently represents $C_{1-12}$ alkyl or alkoxy, or $C_{2-12}$ alkenyl or alkenoxy, wherein one or more nonadjacent —$CH_2$— in the alkyl or alkoxy and the alkenyl or alkenoxy can each be independently replaced by —O— in a manner that oxygen atoms are not directly connected;

ring

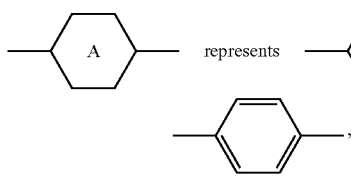

one or more —CH₂— in the

can be replaced by —O—, one or more H on the

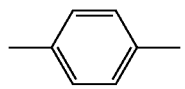

can be substituted by F;

$Z_1$ represents single bond, —CH₂O—, —CF₂O— or —COO—;

m represents 0 or 1.

8. The liquid crystal composition according to claim 6, wherein the liquid crystal composition further comprises at least one compound of general formula III

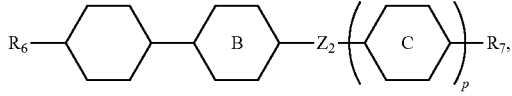

in which, $R_6$ and $R_7$ each independently represents $C_{1-12}$ alkyl or alkoxy, or $C_{2-12}$ alkenyl or alkenoxy, wherein one or more nonadjacent —CH₂— in the alkyl or alkoxy and the alkenyl or alkenoxy can each be independently replaced by —O— in a manner that oxygen atoms are not directly connected;

ring

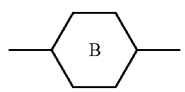

and ring

each independently represents

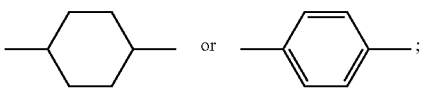

$Z_2$ represents single bond, —CH₂O—, —CF₂O— or —COO—;

p represents 0 or 1.

9. The liquid crystal composition according to claim 7, wherein the liquid crystal composition further comprises at least one compound of general formula III

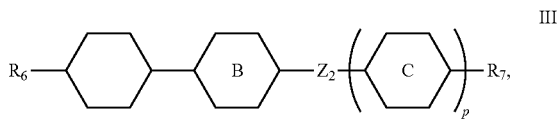

in which, $R_6$ and $R_7$ each independently represents $C_{1-12}$ alkyl or alkoxy, or $C_{2-12}$ alkenyl or alkenoxy, wherein one or more nonadjacent —CH₂— in the alkyl or alkoxy and the alkenyl or alkenoxy can each be independently replaced by —O— in a manner that oxygen atoms are not directly connected;

ring

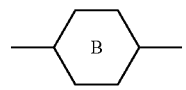

and ring

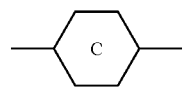

each independently represents

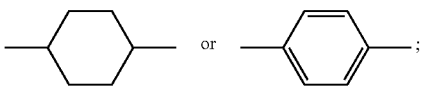

$Z_2$ represents single bond, —CH₂O—, —CF₂O— or —COO—;

p represents 0 or 1.

10. A liquid crystal display device comprising the liquid crystal composition of claim 1.

11. A liquid crystal display device comprising the liquid crystal composition of claim 2.

* * * * *